US007036321B2

(12) United States Patent
Dudebout et al.

(10) Patent No.: US 7,036,321 B2
(45) Date of Patent: May 2, 2006

(54) AUXILIARY POWER UNIT HAVING A ROTARY FUEL SLINGER

(75) Inventors: Rodolphe Dudebout, Phoenix, AZ (US); David H. Edmonds, Tempe, AZ (US); Frank J. Zupanc, Phoenix, AZ (US); Roger J. DeRudder, Scottsdale, AZ (US); Mario Scaini, Phoenix, AZ (US); Victor M. Reyes, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/837,194

(22) Filed: Apr. 30, 2004

(65) Prior Publication Data

US 2005/0076650 A1 Apr. 14, 2005

Related U.S. Application Data

(60) Provisional application No. 60/510,104, filed on Oct. 8, 2003.

(51) Int. Cl.
*F02C 3/06* (2006.01)
*F02C 3/14* (2006.01)

(52) U.S. Cl. ........................ 60/804; 60/745; 60/39.821

(58) Field of Classification Search .................. 60/804, 60/737, 745, 805, 752–754, 39.821, 39.37, 60/39.48
See application file for complete search history.

(56) References Cited

U.S. PATENT DOCUMENTS

| | | | | | |
|---|---|---|---|---|---|
| 2,705,401 | A | | 4/1955 | Allen et al. | |
| 2,856,755 | A | * | 10/1958 | Szydlowski | 60/804 |
| 3,018,625 | A | * | 1/1962 | Bachle | 60/745 |
| 3,020,718 | A | | 2/1962 | Deacon et al. | |
| 3,077,076 | A | * | 2/1963 | Williams et al. | 60/804 |
| 3,102,393 | A | | 9/1963 | Clare | |
| 3,124,933 | A | * | 3/1964 | Stram et al. | 60/39.823 |
| 3,204,408 | A | | 9/1965 | Vincent | |
| 3,304,713 | A | | 2/1967 | Szydlowski | |
| 3,381,471 | A | * | 5/1968 | Szydlowski | 60/745 |
| 3,818,696 | A | * | 6/1974 | Beaufrere | 60/39.512 |
| 3,921,393 | A | | 11/1975 | Bracken, Jr. | |
| 3,932,988 | A | * | 1/1976 | Beaufrere | 60/737 |
| 3,965,699 | A | * | 6/1976 | Bracken, Jr. | 416/170 R |
| 3,983,694 | A | | 10/1976 | Bracken, Jr. | |
| 4,000,608 | A | * | 1/1977 | Chute | 60/804 |
| 4,038,815 | A | | 8/1977 | Heitmann et al. | |
| 4,040,251 | A | * | 8/1977 | Heitmann et al. | 60/804 |

(Continued)

FOREIGN PATENT DOCUMENTS

GB 1 082 232 A 9/1967

(Continued)

OTHER PUBLICATIONS

Lefebvre A., Gas Turbine Combustion, 1999, Taylor and Francis, Second edition, p. 15.*

*Primary Examiner*—William H. Rodriguez
(74) *Attorney, Agent, or Firm*—Ingrassia Fisher & Lorenz

(57) ABSTRACT

An auxiliary power unit (APU) includes a rotary fuel slinger, and a single-spool, two-stage turbine. The rotary fuel slinger receives a rotational drive force from the turbine, and a supply of fuel from a fuel source. The rotary fuel slinger injects the fuel into a combustor as a continuous "fuel sheet." As a result, fuel mixing and atomization inside the combustor is improved, which reduces emissions and pattern factor, which in turn increases turbine life.

19 Claims, 3 Drawing Sheets

U.S. PATENT DOCUMENTS

| | | | | | |
|---|---|---|---|---|---|
| 4,232,515 | A | * | 11/1980 | Brown | 60/204 |
| 4,232,526 | A | * | 11/1980 | Barbeau | 60/745 |
| 4,232,628 | A | | 11/1980 | Shelffo | |
| 4,255,935 | A | * | 3/1981 | Morishita | 60/745 |
| 4,257,236 | A | * | 3/1981 | Morishita | 60/745 |
| 4,257,238 | A | | 3/1981 | Kountz et al. | |
| 4,429,527 | A | * | 2/1984 | Teets | 60/776 |
| 4,597,260 | A | * | 7/1986 | Balsley et al. | 60/39.827 |
| 4,598,544 | A | | 7/1986 | Williams et al. | |
| 4,819,424 | A | | 4/1989 | Bak | |
| 4,870,825 | A | | 10/1989 | Chapman | |
| 5,323,602 | A | | 6/1994 | Defever | |
| 6,148,617 | A | * | 11/2000 | Williams | 60/737 |
| 6,609,880 | B1 | | 8/2003 | Powis et al. | |

FOREIGN PATENT DOCUMENTS

WO PCT/US2004/033118 2/2005

* cited by examiner

AUXILIARY POWER UNIT HAVING A ROTARY FUEL SLINGER

CROSS-REFERENCES TO RELATED APPLICATIONS

This application claims the benefit of U.S. Provisional Application No. 60/510,104, filed on Oct. 8, 2003.

FIELD OF THE INVENTION

The present invention relates to auxiliary power units and, more particularly, to a single-spool auxiliary power unit that includes a rotary fuel slinger.

BACKGROUND OF THE INVENTION

In many aircraft, the main propulsion engines not only provide propulsion for the aircraft, but may also be used to drive various other rotating components such as, for example, generators, compressors, and pumps, to thereby supply electrical and/or pneumatic power. However, when an aircraft is on the ground, its main engines may not be operating. Moreover, in some instances the main propulsion engines may not be capable of supplying the power needed for propulsion as well as the power to drive these other rotating components. Thus, many aircraft include one or more auxiliary power units (APUs) to supplement the main propulsion engines in providing electrical and/or pneumatic power. An APU may also be used to start the propulsion engines.

An APU is, in most instances, a gas turbine engine that includes a combustion system, a power turbine, and a compressor. During operation of the APU, the compressor draws in ambient air, compresses it, and supplies compressed air to the combustion system. The combustion system receives fuel from a fuel source and the compressed air from the compressor, and supplies high-energy combusted air to the power turbine, causing it to rotate. The power turbine includes a shaft that may be used to drive a generator for supplying electrical power, and to drive its own compressor and/or an external load compressor.

The combustion system in an APU may include a combustor, a plurality of fuel injectors, one or more fuel manifolds, and a high-pressure pump. These combustion system components can be relatively expensive to manufacture and install. Moreover, the fuel injectors may foul due to coking of the small fuel passages that extend through the injectors. This fouling can necessitate injector cleaning, which can be costly and time consuming. Fuel injector fouling can also cause hot streaks in both the combustor and downstream hot section, which can reduce the overall life of the combustor and the downstream hot section, and an uneven temperature profile in the APU, which can cause hot corrosion of, and/or thermal fatigue to, the turbine. These latter effects can also increase system operational and ownership costs.

Hence, there is a need for an APU that is both durable and reliable, and that can be fabricated and operated at reduced costs relative to current APUs, by eliminating most, if not all, of the above-noted drawbacks associated with present APU combustion systems. The present invention addresses one or more of these needs.

SUMMARY OF THE INVENTION

The present invention provides and auxiliary power unit (APU) that is durable, reliable, and can be fabricated and operated at reduced costs relative to current APUs.

In one embodiment, and by way of example only, an APU includes a compressor, a radial combustor, a rotary fuel slinger, an igniter, a turbine, and a turbine inlet nozzle. The compressor has an air inlet and a compressed air outlet, and is operable to supply a flow of compressed air. The radial combustor includes at least a forward radial liner and an aft radial liner spaced apart from one another to form a combustion chamber therebetween. The forward and aft radial liners each include a plurality of openings in fluid communication with the compressed air outlet, to thereby receive at least a portion of the flow of compressed air therefrom. The plurality of openings are configured to generate a single toroidal recirculation air flow pattern in the combustion chamber. The rotary fuel slinger is adapted to receive a rotational drive force, and is further adapted to receive a flow of fuel from a fuel source. The rotary fuel slinger is configured, upon receipt of the rotational drive force, to centrifuge the received fuel into the combustion chamber. The igniter extends through the aft radial liner and at least partially into the combustion chamber, and is adapted to receive an ignition command and is operable, in response thereto, to ignite the fuel and compressed air in the combustion chamber, to thereby generate combusted gas. The turbine is coupled to receive the combusted gas from the combustion chamber and is configured, in response thereto, to supply at least the rotational drive force to the rotary fuel slinger. The turbine inlet nozzle is disposed between the radial combustor and the turbine inlet, and is configured to change a flow direction of the combusted gas from a radial flow direction to an axial flow direction.

Other independent features and advantages of the preferred APU will become apparent from the following detailed description, taken in conjunction with the accompanying drawings which illustrate, by way of example, the principles of the invention.

DETAILED DESCRIPTION OF A PREFERRED EMBODIMENT

Figure 1:
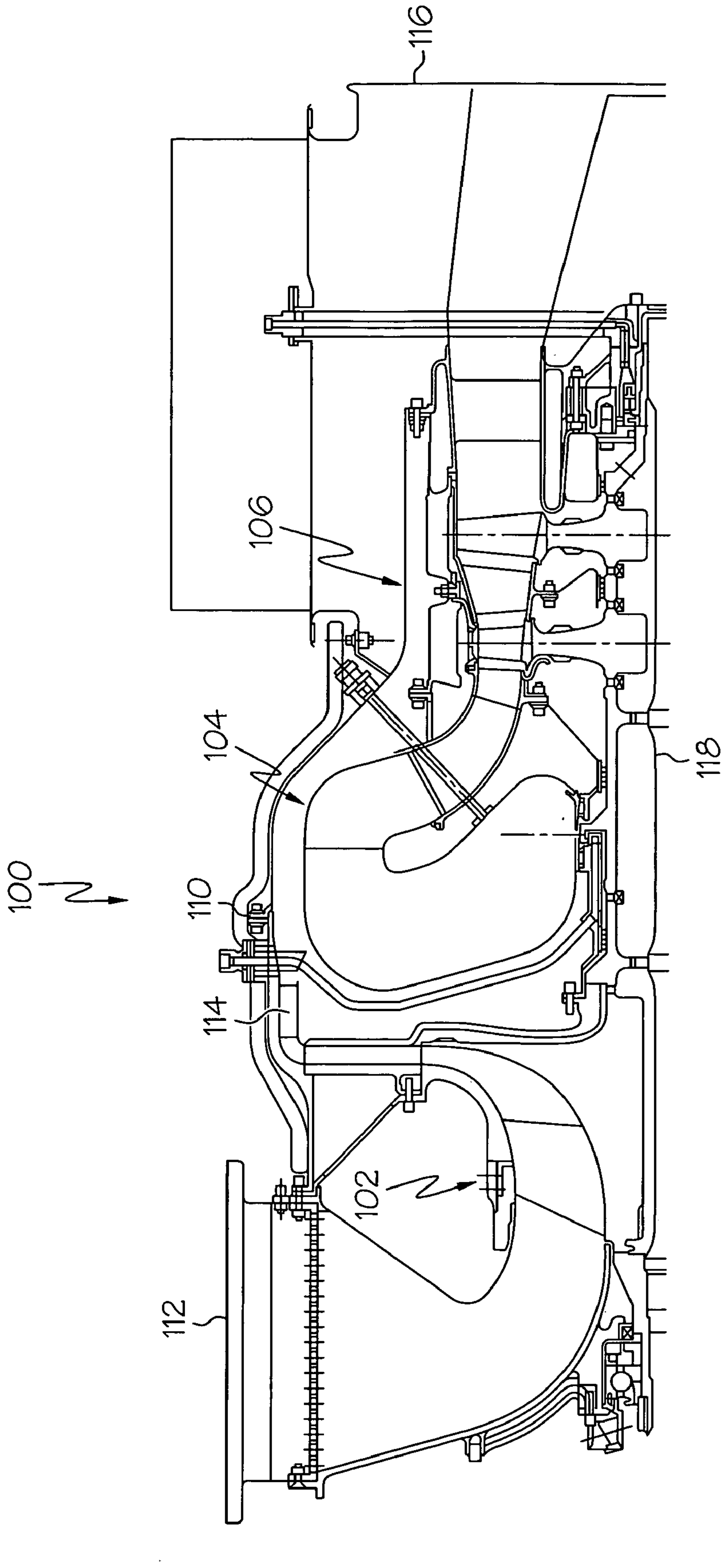
FIG. 1 is a cross section view of a portion of an auxiliary power unit according to an exemplary embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention Turning now to the description and with reference to FIG. 1, a cross section view of a portion of an exemplary embodiment of an auxiliary power unit (APU) is shown. The APU 100 includes a compressor 102, a combustion system 104, and a turbine 106, all disposed within a case 110. Air is directed into the compressor 102 via an air inlet 112. The compressor 102 raises the pressure of air and supplies compressed air via a diffuser 114. In the depicted embodiment, the compressor 102 is a single-stage, high-pressure ratio centrifugal compressor. However, it will be appreciated that this is merely exemplary of a preferred embodiment, and that other types of compressors could also be used.

The compressed air from the compressor 102 is directed into the combustion system 104, where it is mixed with fuel supplied from a fuel source (not shown). In the combustion system 104 the fuel/air mixture is combusted, generating high-energy gas. The high-energy gas is then diluted and supplied to the turbine 106. A more detailed description of the combustion system 104, and the various components that provide this functionality, is provided further below.

The high-energy, diluted gas from the combustion system 104 expands through the turbine 106, where it gives up much of its energy and causes the turbine 106 to rotate. The gas is then exhausted from the APU 100 via an exhaust gas outlet 116. As the turbine 106 rotates, it drives, via a turbine shaft 118, various types of equipment that may be mounted in, or coupled to, the engine 100. For example, in the depicted embodiment the turbine 106 drives the compressor 102. It will be appreciated that the turbine may also be used to drive a generator and/or a load compressor and/or other rotational equipment, which are not shown in FIG. 1 for ease of illustration.

Figure 2:
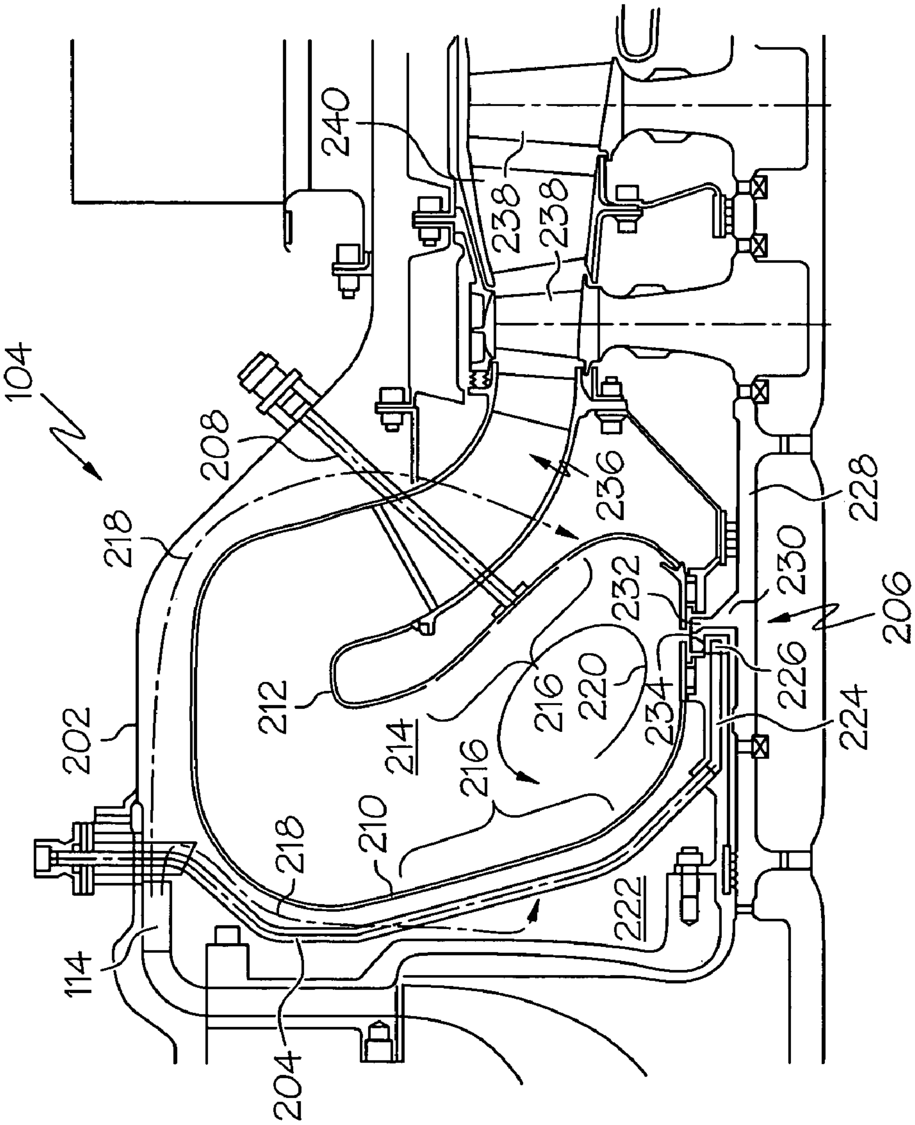
FIG. 2 is a cross section view of a combustion system that is used in the auxiliary power unit of FIG. 1, according to an exemplary embodiment of the present invention.

With reference now to FIG. 2, a more detailed description of the combustion system 104 will be provided. The combustion system 104 includes a combustor 202, a fuel supply tube 204, a rotary fuel slinger 206, and an igniter 208. The combustor 202 is a radial-annular combustor, and includes a forward annular liner 210, and an aft annular liner 212. The forward and aft annular liners 210, 212 are spaced apart from one another and form a combustion chamber 214. The forward and aft annular liners 210, 212 each include a plurality of air inlet orifices 216 (only some of which are shown), and a plurality of effusion cooling holes (not illustrated). As illustrated via the flow arrows in FIG. 2, compressed air 218 from the compressor 102 flows into the combustion chamber 214 via the air inlet orifices 216 in both the forward and aft annular liners 210, 212. The air inlet orifices 216 are preferably configured to generate a single toroidal recirculation flow pattern 220 in the combustion chamber 214. It will be appreciated that compressed air also flows into the combustion chamber 214 via the effusion cooling holes. The primary purpose of these holes, however, is to provide effusion cooling to the liners 210, 212.

The fuel supply tube 204, which is preferably a steel tube, extends into a plenum 222 just forward of the combustor 202 and is adapted to receive a flow of fuel from a non-illustrated fuel source. The fuel supply tube 204 is preferably routed through the plenum 222, and is preferably configured with sufficient flexibility, to allow for any thermal mismatches that may occur between other components and systems in the APU 100 during operation. The fuel supplied to the fuel supply tube 204 passes through the tube 204, and is directed into a fuel housing 224. In the depicted embodiment, the fuel housing 224 is configured as a circumferential cavity, though it will be appreciated that other configurations could also be used. The fuel housing 224 includes a plurality of equally spaced holes 226, through which the fuel is jetted to the rotary fuel slinger 206.

Figure 4:
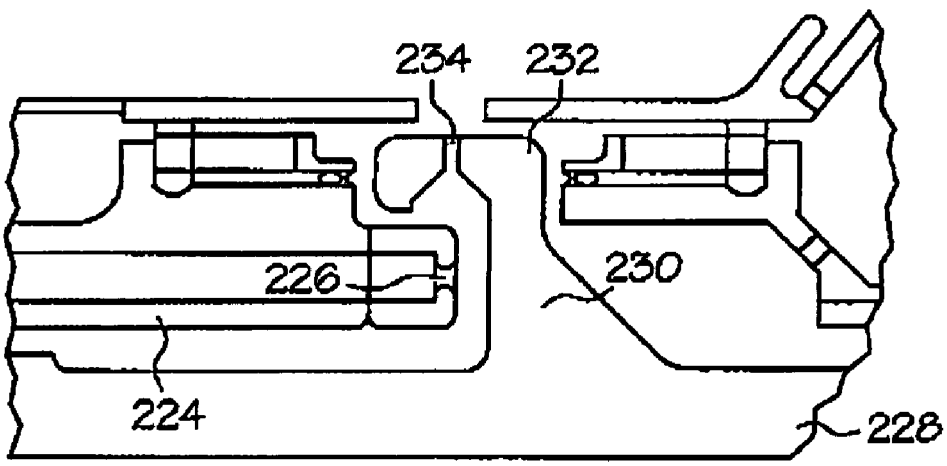
FIG. 4 is a close-up cross section view of a rotary fuel slinger that is used in the combustion system of FIG. 2.

The rotary fuel slinger 206, which is shown more clearly in FIG. 4, includes a coupler shaft 228, a vertical shoulder 230, and a slinger 232. The coupler shaft 228 is coupled to the turbine shaft 118 and rotates therewith. The vertical shoulder 230 is coupled to, and is preferably formed as an integral part of, the coupler shaft 228 and thus rotates with the coupler shaft 228. The fuel that is jetted through the holes 226 in the fuel housing 224 impinges onto the vertical shoulder 230. Because the vertical shoulder 230 rotates with the coupler shaft 228, the impinging fuel acquires the tangential velocity of the coupler shaft 228 and gets centrifuged into the slinger 232.

The slinger 232 is coupled to, and is preferably formed as an integral part of, the vertical shoulder 230 and thus also rotates with the coupler shaft 228. In the depicted embodiment, the slinger 232 has a substantially cup-shaped radial cross section, and includes a plurality of relatively small, equally spaced holes or slots 234 for (clarity, only one shown in FIG. 4). As the slinger 232 rotates, fuel is centrifuged through these holes 234, which atomize the fuel into tiny droplets and is evenly distributes the fuel into the combustion chamber 214. The evenly distributed fuel droplets are readily evaporated and ignited in the combustion chamber 214.

The igniter 208 extends through the aft annular liner 212 and partially into the combustion chamber 214. The igniter 208, which may be any one of numerous types of igniters, is adapted to receive energy from an exciter (not shown) in response to the exciter receiving an ignition command from an external source, such as an engine controller (not illustrated). In response to the ignition command, the igniter 208 generates a spark of suitable energy, which ignites the fuel-air mixture in the combustion chamber 214, and generates the high-energy combusted gas that is supplied to the turbine 106.

Figure 3:
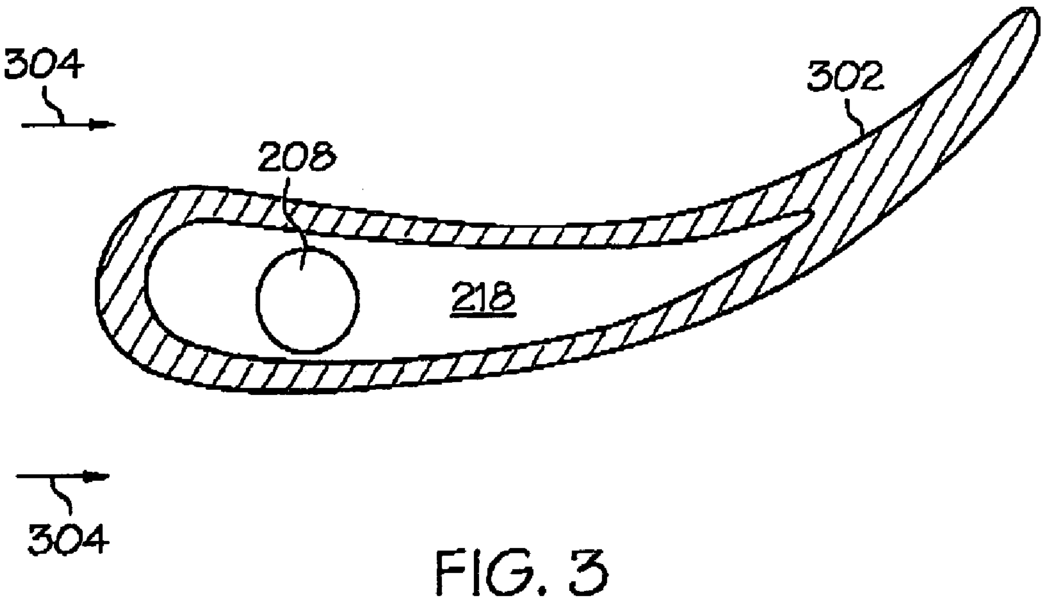
FIG. 3 is a simplified cross section view of a portion of a turbine inlet nozzle that is used in the auxiliary power unit of FIG. 1.

The high-energy combusted gas is supplied from the combustor 202 to the turbine 106 via a turbine inlet nozzle 236. As FIG. 2 shows, the turbine inlet nozzle 236 is configured to change the flow direction of the combusted gas from a radial flow direction to an axial flow direction. As shown in FIG. 3, which depicts a simplified cross section view of a portion of the turbine inlet nozzle 236, the turbine inlet nozzle 236 is configured to include a plurality of hollow vanes 302 (only one shown in FIG. 3). These hollow vanes 302 facilitate passage of the igniter 208 through the turbine inlet nozzle 236, and passage of the compressed air 218 that is used to feed the aft annular liner 212. As shown in FIG. 3, the compressed air 218 flows through the inside of the vanes 302, and the combusted gas 304 from the combustor 202 flows around the outside of the vanes 302.

Returning once again to FIG. 2, it is seen that the turbine 106 is preferably implemented as a two-stage turbine. Thus, two sets of turbine rotors 238 are disposed on either side of a second turbine nozzle 240. As the high-energy combusted air passes through the nozzles 236, 240 and impinges on the rotors 238, the rotors 238 rotate, which in turn causes the turbine shaft 118 to rotate, which in turn rotates the various other equipment that is coupled to the turbine shaft 118.

The APU 100 depicted and described herein includes, among other things, a rotary fuel slinger to supply fuel to the combustor. As a result, fuel mixing and atomization inside the combustor is improved due to the injection of a continuous "sheet" of fuel versus a traditional discreet, segregated pattern of injectors arranged circumferentially in an annular combustor. Improved fuel atomization and mixing can result in reduced emissions and a reduced pattern factor, which can increase turbine life. Use of a fuel slinger eliminates the fuel nozzles and associated manifold components, thereby reducing part count, lowering acquisition costs, increasing reliability, improving maintainability, and reducing operating expenses. In addition, the fuel pressure that may be needed to achieve good atomization of the fuel is much lower than in conventional fuel supply system. For example, fuel pressures only slightly above the pressure in the combustion chamber are sufficient. This can alleviate potentially stringent requirements that may be associated with the fuel delivery system.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An auxiliary power unit, comprising:

a compressor having an air inlet and a compressed air outlet, and operable to supply a flow of compressed air;

a radial-annular combustor including at least a forward radial liner and an aft radial liner spaced apart from one another to form a combustion chamber therebetween, the forward and aft radial liners each including a plurality of openings in fluid communication with the compressed air outlet, to thereby receive at least a portion of the flow of compressed air therefrom, the plurality of openings configured to generate a single toroidal recirculation air flow pattern in the combustion chamber;

a rotary fuel slinger including a coupler shaft, a vertical shoulder, and a slinger, the coupler shaft adapted to receive a rotational drive force, the vertical shoulder coupled to, and extending substatially perpendicular from, the coupler shaft, the slinger extending substantially perpendicular from the vertical shoulder and including a plurality of evenly spaced openings extending therethrough, the rotary fuel slinger further adapted to receive a flow of fuel from a fuel source and configured, upon receipt of the rotational drive force, to centrifuge the received fuel into the combustion chamber;

a vertical shoulder coupled to, and extending substantially perpendicularly from, the coupler shaft;

a slinger extending substantially perpendicularly from the vertical shoulder, the slinger including a plurality of evenly spaced openings extending therethrough;

an igniter extending through the aft radial liner and at least partially into the combustion chamber, the igniter adapted to receive an ignition command and operable, in response thereto, to ignite the fuel and compressed air in the combustion chamber, to thereby generate combusted gas;

a turbine coupled to receive the combusted gas from the combustion chamber and configured, in response thereto, to supply at least the rotational drive force to the rotary fuel slinger; and a turbine inlet nozzle disposed between the radial combustor and the turbine inlet, the turbine nozzle configured to change a flow direction of the combusted gas from a radial flow direction to an axial flow direction.

2. The auxiliary power unit of claim 1, further comprising:

a fuel housing adapted to receive a flow of fuel and configured to supply the flow of fuel to the rotary fuel slinger.

3. The auxiliary power unit of claim 2, further comprising:

a fuel tube having an inlet and an outlet, the fuel tube inlet adapted to receive a flow of fuel, the fuel tube outlet in fluid communication with the fuel housing to supply the flow of fuel thereto.

4. The auxiliary power unit of claim 1, wherein the turbine is a two-stage turbine.

5. The auxiliary power unit of claim 1, wherein the igniter extends through at least a portion of the turbine nozzle.

6. The auxiliary power unit of claim 1, wherein the turbine inlet nozzle includes a plurality of hollow vanes configured to fluidly communicate the aft radial liner with the compressed air outlet.

7. The auxiliary power unit of claim 6, wherein the igniter extends through one of the hollow vanes.

8. The auxiliary power unit of claim 1, wherein the slinger has a substantially cup-shaped radial cross section.

9. The auxiliary power unit of claim 1, wherein the fuel supplied to the rotary fuel slinger impinges on the vertical shoulder and is centrifuged into the slinger.

10. An auxiliary power unit, comprising:

a compressor having an air inlet and a compressed air outlet, the compressor coupled to receive a rotational drive force and operable, in response thereto, to supply a flow of compressed air;

a radial-annular combustor including at least a forward radial liner and an aft radial liner spaced apart from one another to form a combustion chamber therebetween, the forward and aft radial liners each including a plurality of openings in fluid communication with the compressed air outlet, to thereby receive at least a portion of the flow of compressed air therefrom, the plurality of openings configured to generate a single toroidal recirculation air flow pattern in the combustion chamber;

a rotary fuel slinger adapted to receive a rotational drive force, the rotary fuel slinger further adapted to receive a flow of fuel from a fuel source and configured, upon receipt of the rotational drive force, to centrifuge the received fuel into the combustion chamber;

an igniter extending through the aft radial liner and at least partially into the combustion chamber, the igniter adapted to receive an ignition command and operable, in response thereto, to ignite the fuel and compressed air in the combustion chamber, to thereby generate combusted gas;

a turbine coupled to receive the combusted gas from the combustion chamber and configured, in response thereto, to supply the rotational drive force to at least the compressor and the rotary fuel slinger; and a turbine inlet nozzle disposed between the radial combustor and the turbine inlet, the turbine inlet nozzle configured to change a flow direction of the combusted gas from a radial flow direction to an axial flow direction, and including a plurality hollow vanes configured to fluidly communicate the aft radial liner with the compressed air outlet.

11. The auxiliary power unit of claim 10, further comprising: a fuel housing adapted to receive a flow of fuel and configured to supply the flow of fuel to the rotary fuel slinger.

12. The auxiliary power unit of claim 11, further comprising: a fuel tube having an inlet and an outlet, the fuel tube inlet adapted to receive a flow of fuel, the fuel tube outlet in fluid communication with the fuel housing to supply the flow of fuel thereto.

13. The auxiliary power unit of claim 10, wherein the igniter extends through at least a portion of the turbine nozzle.

14. The auxiliary power unit of claim 10, wherein the igniter extends through one of the hollow vanes.

15. The auxiliary power unit of claim 10, wherein the rotary fuel slinger comprises:

a coupler shaft coupled to receive the rotational drive force from the turbine;

a vertical shoulder coupled to, and extending substantially perpendicularly from, the coupler shaft; and a slinger extending substantially perpendicularly from the vertical shoulder, the slinger including a plurality of evenly spaced openings extending therethrough.

16. The auxiliary power unit of claim 15, wherein the slinger has a substantially cup-shaped radial cross section.

17. The auxiliary power unit of claim 15, wherein the fuel supplied to the rotary fuel slinger impinges on the vertical shoulder and is centrifuged into the slinger.

18. The auxiliary power unit of claim 10, wherein the turbine is a two-stage turbine.

19. An auxiliary power unit, comprising:

a compressor having an air inlet and a compressed air outlet, the compressor coupled to receive a rotational drive force and operable, in response thereto, to supply a flow of compressed air;

a radial-annular combustor including at least a forward radial liner and an aft radial liner spaced apart from one another to form a combustion chamber therebetween, the forward and aft radial liners each including a plurality of openings in fluid communication with the compressed air outlet, to thereby receive at least a portion of the flow of compressed air therefrom, the plurality of openings configured to generate a single toroidal recirculation air flow pattern in the combustion chamber;

a fuel housing adapted to receive a flow of fuel from a fuel source;

a rotary fuel slinger adapted to receive a rotational drive force, the rotary fuel slinger further adapted to receive a flow of fuel from the fuel housing and configured, upon receipt of the rotational drive force, to centrifuge the received fuel into the combustion chamber;

an igniter extending through the aft radial liner and at least partially into the combustion chamber, the igniter adapted to receive an ignition command and operable, in response thereto, to ignite the fuel and compressed air in the combustion chamber, to thereby generate combusted gas;

a single-spool, two-stage turbine coupled to receive the combusted gas from the combustion chamber and configured, in response thereto, to supply the rotational drive force to at least the compressor and the rotary fuel slinger; and a turbine inlet nozzle disposed between the radial combustor and the turbine inlet, the turbine nozzle configured to change a flow direction of the combusted gas from a radial flow direction to an axial flow direction, the turbine inlet nozzle including a plurality of hollow vanes configured to fluidly communicate the aft radial liner with the compressed air outlet, and wherein the igniter extends through one of the hollow vanes.

* * * * *